June 18, 1929.　　　S. J. BENS　　　1,717,547
PORTABLE TREE SAWING APPARATUS
Filed Nov. 16, 1926　　　5 Sheets-Sheet 4

Inventor:
Samuel J. Bens,
by Spear, Middleton Donaldson Hall
Attys.

Inventor:
Samuel J. Bens,

Patented June 18, 1929.

1,717,547

UNITED STATES PATENT OFFICE.

SAMUEL J. BENS, OF NEW YORK, N. Y., ASSIGNOR TO CHAIN SAW CORPORATION, A CORPORATION OF DELAWARE.

PORTABLE TREE-SAWING APPARATUS.

Application filed November 16, 1926. Serial No. 148,766.

My present invention relates to improvements in portable power driven apparatus for sawing trees and logs, and has, among its objects, to provide a simple, compact, durable and efficient machine capable of being easily handled by a couple of operators to rapidly and expeditiously cut trees and logs irrespective of their position, whether vertical or horizontal, or at any inclination therebetween, and one which can be readily conveyed from place to place.

The invention includes the novel features of construction and arrangement and combinaton of parts hereinafter described, all of which cooperate to produce the results above referred to and the particular advantages later described in detail, the nature and scope of the inventon being particularly defined and ascertained by the claims appended hereto.

In order that my invention may be better understood, I have appended hereto several sheets of drawings illustrating what I at present consider the best form of such machine, in which drawings—

Figure 1 is a plan view.

Figure 1ª is a detailed end view of the bar frame.

Figure 8 is an enlarged plan view of a portion of the chain saw.

Figure 9 is an edge view of the links of Figure 8.

Figure 10 is a sectional view on the line 10—10 of Figure 8.

Figure 11 shows details of the rivet used for pivoting saw links together.

My improved machine comprises a motor unit and an idler unit for the driving and idler pulleys or sheaves which carry the endless cutting saw of link tooth formation, these units being connected by a main frame.

This frame comprises an arch-shaped or curved bar 1, preferably of tubular construction, the ends of which are rigidly but adjustably connected by angle unions 1ª and 1ᵇ, comprising toothed elements $x$ and $y$, to post or bar members 2 and 3, which in turn are rigidly connected to the motor and idler units respectively. The angle unions 1ª and 1ᵇ have portions engaging the posts 2 and 3 and secured thereto by rivets 2ª and 3ª. The bar 1 may be adjusted to any desired position on the posts and rigidly clamped thereto by the clamping bolts $a$ and $b$, holding the toothed elements $x$ and $y$ in proper position.

Figure 1:
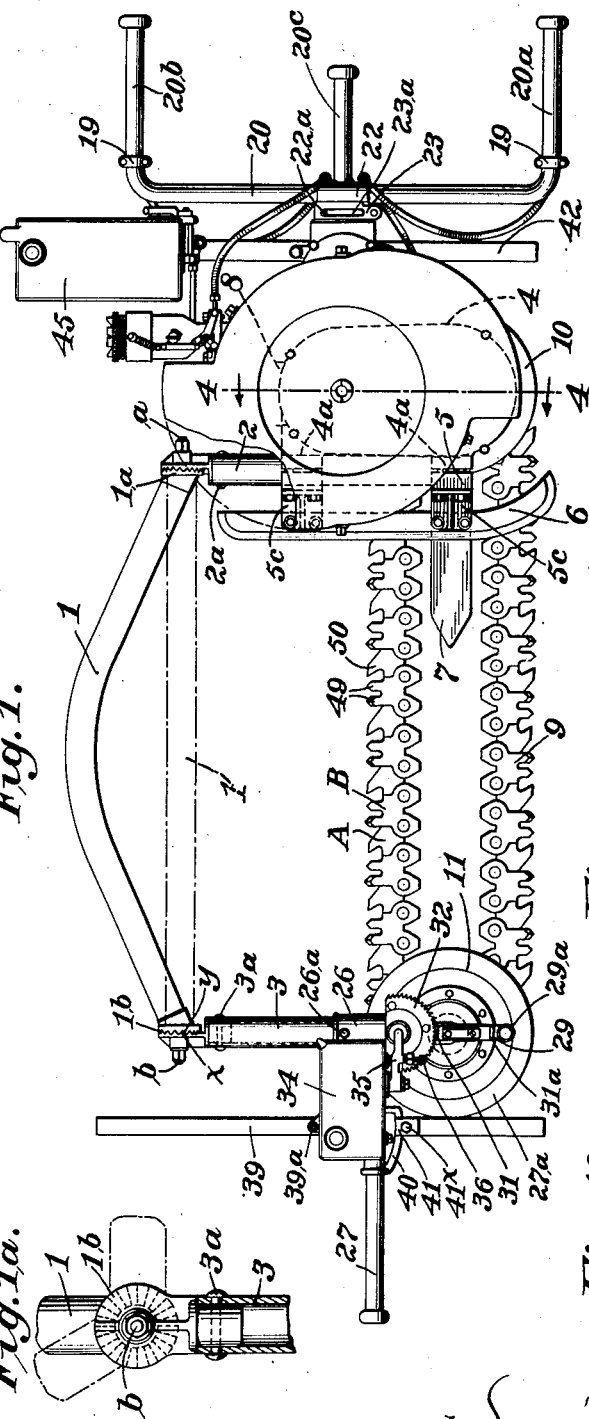
Figure 2:
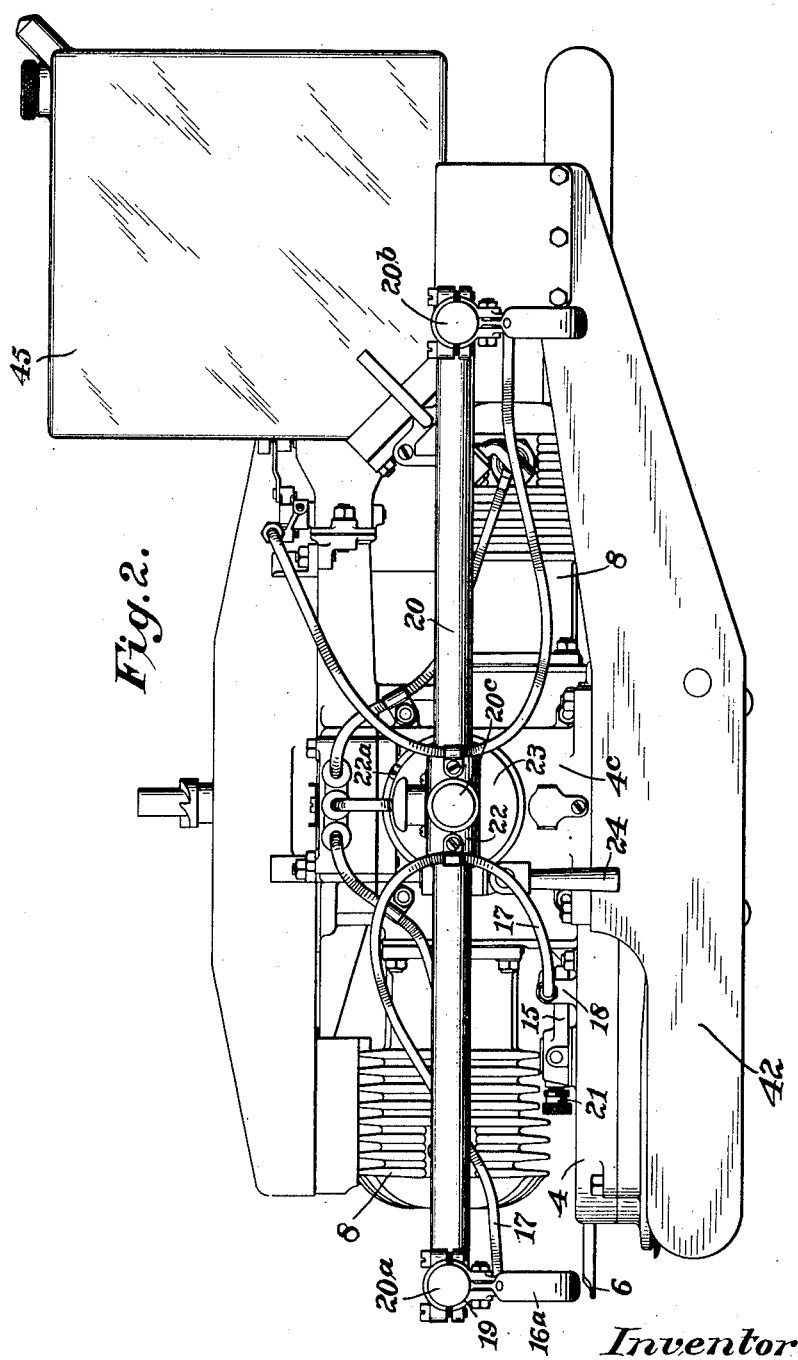
Figure 2 is an end elevation of the saw structure.

By this arrangement the connecting frame member 1 may be adjusted towards or from the cutting chain, as desired, according to the size of trees or logs being operated on, or character of the work, within certain limits, two positions of adjustment being indicated by the full and dotted lines in Figure 1. It will also be evident that a greater range of adjustment is possible by removing frame member 1 and replacing it with one of a different size, a correspondingly longer or shorter chain saw being likewise substituted.

The bar members 2 and 3, also preferably of tubular formation, may be clamped to the motor unit frame in any desired manner, but I prefer to provide the motor frame member 4 with semi-cylindrical seatings 4ª to which cooperating clamping blocks 5 are secured by suitable bolts 5ª, these clamping blocks having corresponding semi-cylindrical seats to receive the bar member, and a groove 5ᵇ to receive the rib or spline of the frame member 2. This clamping block I utilize to carry or support the surface blade member 6, which is in the form of an elongated bar lying in a plane parallel to the plane of the saw and having a preferably curved end projecting beyond the cutting rim of the saw, this bar having a sharpened portion or knife edge to bite into the bark of the tree or log to aid in supporting or positioning the machine in starting the cut. the knife edge sliding easily along the surface as the saw penetrates the wood, but preventing any danger of slipping or displacement of the machine in a plane perpendicular to the saw. My preferred manner of connecting the surface blade to the block is to provide the latter with a bracket extension 5ᶜ, to the under face of which the blade is bolted as shown.

To further guard against any displacement of the machine as the cut progresses, and hold it in true alignment, thereby preventing any undue strain on, or binding of the saw, and to secure it to make a straight cut under any varying conditions, such as movements of the operator, I provide a relatively wide kerf blade 7 which lies in the plane of the saw between the two runs thereof and between the cutting and idler sides as shown in Figure 1) and is sufficiently thin to freely enter the saw kerf, but stiff and wide enough to resist any twisting movement. My preferred manner of mounting this is to provide it with an angularly-turned end 7ª bolted to the outer face of block member 5, as shown. By reason of the bracket extension 5ᶜ, a space is provided between the surface blade and the kerf blade, which permits the passage of knots or protuberances on the tree or log. By supporting the blade at one end only and that the power end of the frame, I find that a much straighter cutting action is secured and without any danger of binding. This kerf blade supports the mechanism as it operates through the tree.

Post member 2 supports the motor, shown conventionally at 8, and which is preferably in the form of a double cylinder, two-cycle, air-cooled engine. The chain saw, indicated at 9, passes around and is driven by, the driving pulley 10, being supported at its opposite end by the idler pulley 11 supported in the manner hereinafter described.

The type of tooth constituting saw 9 may consist of links A and B having overlapping portions, links B being provided with cutting teeth 49 and links A with drag teeth 50 which clean the sawdust from the kerf. The link B is provided with a stepped aperture indicated at 51 in which the ledge or step is shown at 52, which is adapted to overlie an operture 53 in the link A, which aperture has a beveled outer surface indicated at 54.

The rivet which I have found desirable to use with this structure consists of a double stepped head portion consisting of the step 55 and the step 56, and a main shank portion 57. This rivet is preferably case hardened so as to minimize wear. The combined thickness of the steps 55 and 56 should be preferably slightly greater than the thickness of the link B so that when the stepped head of the rivet is inserted into the aperture 51 the under portion of the step 56 will bear against the link A to a slight extent and therfore, space the link A from the link B to an extent that friction between the links A and B is practically prevented. In order to increase this clearance the overlapping parts of the links A and B are machined into as nearly perfect plane surfaces as can be had. It is to be understood that while I desire to have the links A and B clear each other, yet this clearance is, preferably, only a few thousandths of an inch and is practically imperceptible. Therefore, this clearance has not been shown in the drawing, but it is to be understood that actually the adjacent overlapping faces of the links A and B are spaced apart a sufficient amount to allow for working.

The shank 57 of the rivet extends through the aperture 53 of the link A and is headed over against the beveled portion 54 thereof. In order that the rivet may become practically a part of the link A and immovably fixed thereon, I provide a recess 58 in the beveled portion of the aperture in the link A so that the rivet, when headed, flows into the recess and becomes practically integral with the link A.

In order to further minimize friction between the rivet and the link B, I make the diameter of the rises in the steps 55 and 56 slightly less, that is, a few thousandths of an inch less than the diameter of the rises in the steps in the aperture 51 of the link B. It will thus be seen that when the two links are riveted together the overlapping portions of the links A and B are practically out of contact with each other and that the link B may be pivoted about the rivet as an axis, the rivet remaining stationary with the link A.

I preferably form the links by stamping the same from soft or low carbon steel and afterwards case hardening the same by any desired process, which gives a hard wearing surface, and a comparatively soft center, which is desirable in constructions of this nature.

To enable the driving pulley to be conveniently controlled as to starting and stopping without affecting the operation of the engine, I provide the following arrangement of parts.

Rotatably mounted in a suitable bearing hub 4ᵇ is a shaft 12 which has an eccentric portion 12ª on which the driving pulley is rotatably mounted. Preferably I make the pulley rim detachable from its carrying member which latter, in the embodiment shown, is in the form of a disc member 10ª having a hub 10ᵇ journaled on ball bearings 10ᶠ on the eccentric projection 12ª. The bearings are accessible for replacement through closure member 10ᵍ held in position by nuts 10ʰ threaded on the projecting end of shaft 12ª. The drive pulley comprises the flange portions, designated 10, and the interposed strain receiving portion 10ˣ located between the inner overlying portions of the flange members, the three overlying parts being secured to the under face of member 10ª by bolts 10ᶜ, and abutting at their inner edges against the outer face of an annular flange 10ᵈ which relieves the bolts of the pulling strain. The driving pulley member 10ª has also secured thereto a power transmitting member 13 which meshes with a coacting power member 14 carried by the engine shaft in a manner hereinafter described. Preferably this gear member 13 takes the form of a circular metal ring having exterior circumferential grooves 13ª of tapered form in cross section and having a flange 13$^b$ at one edge secured to the member 10$^a$ by the bolts 10$^c$. The portion of the member 4 which constitutes a chamber for the friction drive, is extended to protect the drive from the entrance of sawdust by closure member 4$^x$ which has a flanged portion overlying the upper flange of the drive pulley.

Driving member 14 has a non-metallic rim portion 14$^a$ which is provided with peripheral ribs 14$^b$ corresponding to and coacting with the grooves of member 13.

Shaft 12 has fast on the upper end thereof, an arm 15 by which it may be oscillated and a rocking motion will cause the eccentric portion 12$^a$ to carry the friction gear member towards or from the member 14 thereby starting or stopping the drive according to the direction of movement.

Figure 3:
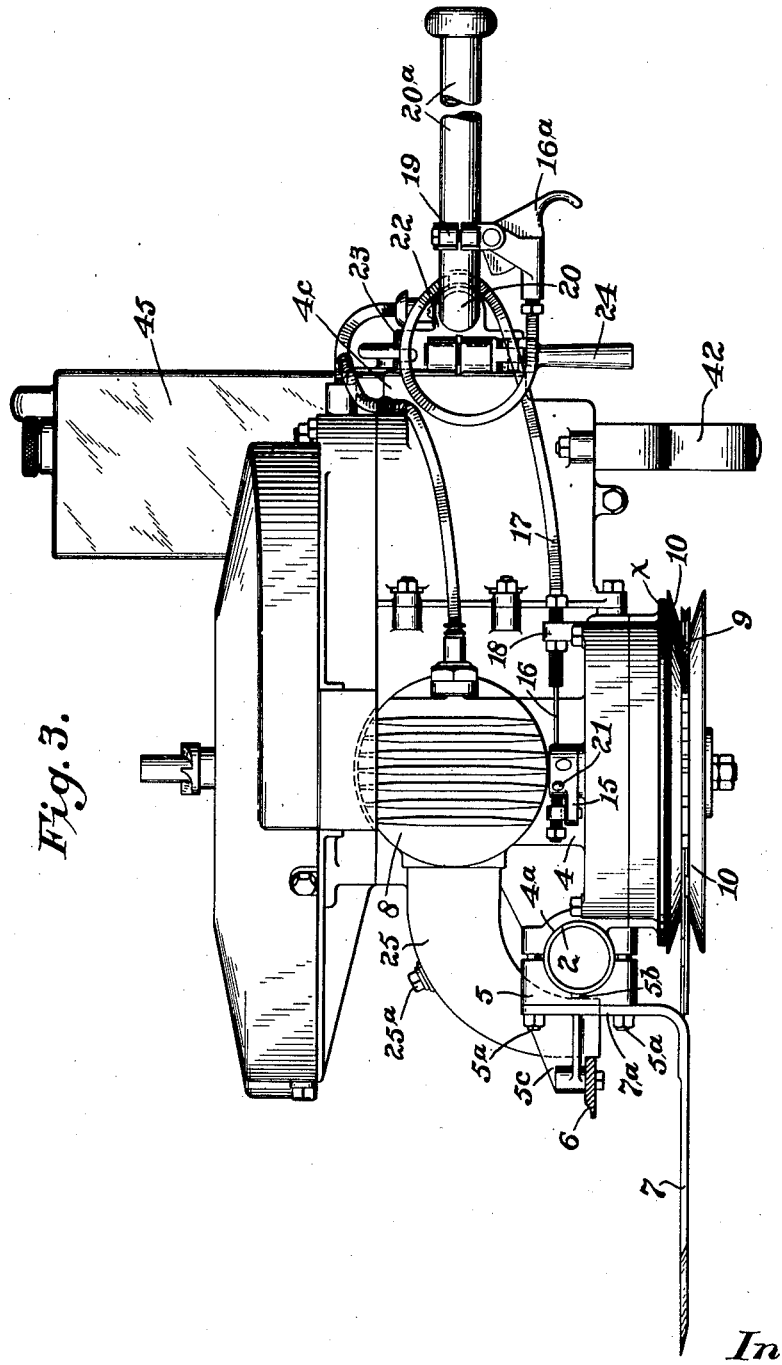
Figure 3 is a front elevation of the drive end of the saw structure.
Figure 4:
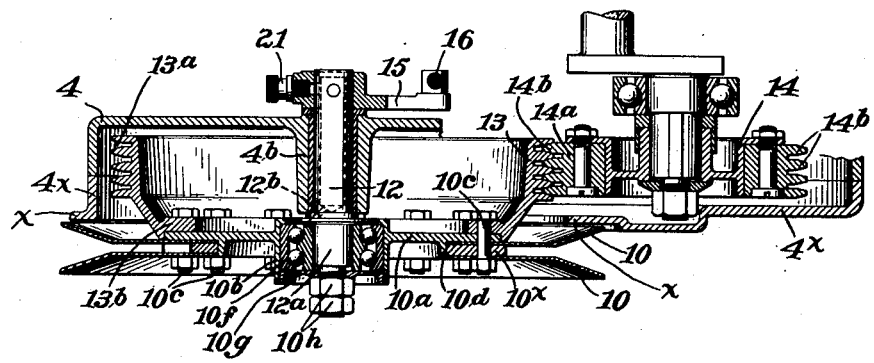
Figure 4 is a sectional elevation along line 4—4 of Figure 1.
Figure 5:
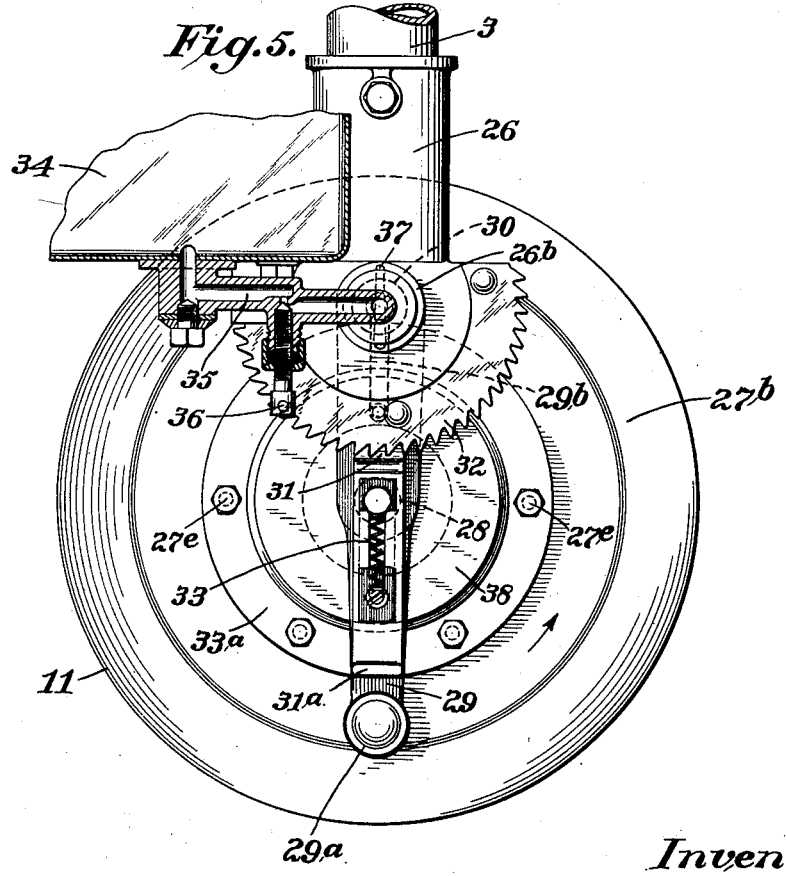
Figure 5 is an enlarged plan view partly in section of the idler sheave and associated mechanism.
Figure 6:
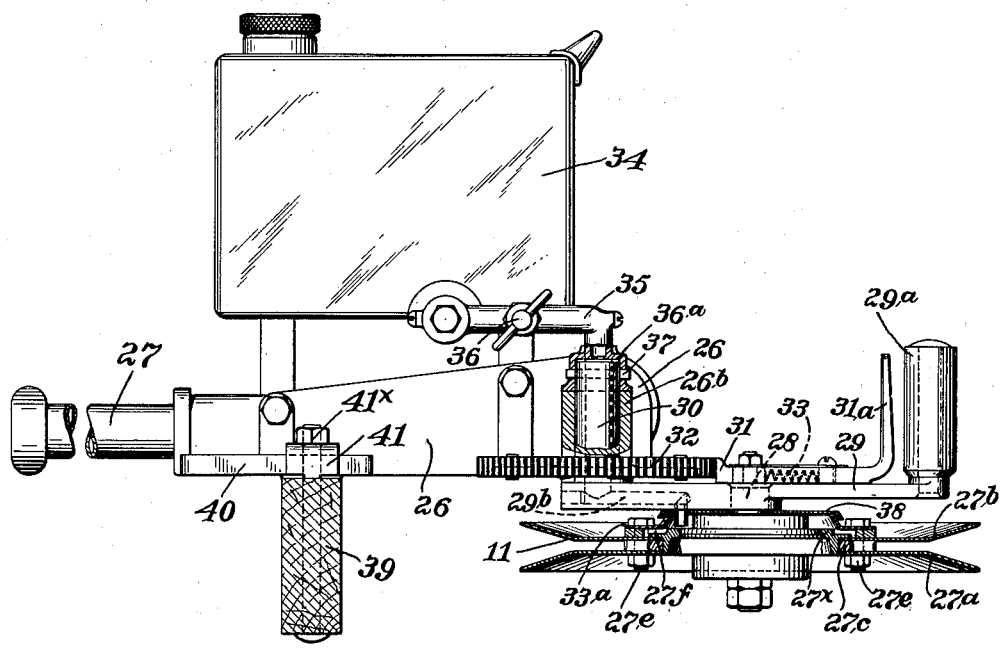
Figure 6 is a fragmental front view of the idler end of the machine with the sheave in released position.
Figure 7:
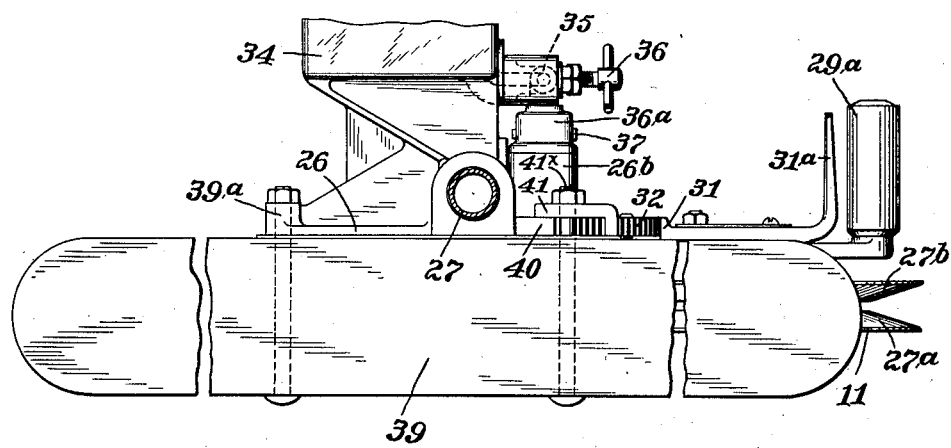
Figure 7 is a partial end elevation of the idler end of the device of Figure 1.

For convenience in controlling the movement of the arm 15 from a point convenient to the operator, I provide a flexible rod 16, Figure 3, connected at one end to said arm and thence passing through a guide tube 17, one end of which is adjustably clamped to a bracket 18 on member 4, while the other end is secured to a bracket 19 clamped to the rigid handle member 20$^a$. A finger lever 16$^a$ pivotally supported by this bracket, is arranged to actuate this rod.

The shaft 12 is preferably provided with a hollow interior forming an oil receiving chamber to which lubricant is supplied by a suitable oil adjusting device indicated at 21, and from whence it finds its way to the bearing 13 by passage 12$^b$.

The handle 20$^a$ is one of three, 20$^a$, 20$^b$, and 20$^c$, located at the motor end of the machine, which handles are spaced wide apart, and two of which are to be grasped by the hands of the operator at that end, and the third handle by a helper, the handle member 20$^c$ being equipped with a finger lever similar to 16$^a$ designed to control the speed of the motor. The engine may be supplied with fuel by a suitable tank such as is shown at 45. The handle members 20$^a$ and 20$^b$ are preferably formed as integral angularly-turned end portions of a bar 20 rigidly held by a rotatable hub member 22 which latter is adapted to be clamped in any desired position by split clamping member 23 controlled by cam lever 24 and carried by the frame extension 4$^c$. Rotation of the hub is limited by a stop member, such as a set screw 22$^a$ working in slot 23$^a$.

I have found that in working in resinous woods, better results are accomplished if the saw is kept moderately hot and thoroughly lubricated, and thereby prevented from gumming up. Where a two cycle engine is used, such as is indicated conventionally at 8, the oil which is introduced into the gasoline cylinder for lubricating, or which mingles with the gas in the crank case, after performing its work, passes out mingled with the exhaust. By causing the exhaust pipe 25 to terminate at a point where it will discharge the exhaust products from the engine directly onto the saw, the latter is warmed up by the heated products and receives a deposit of the oil mingled with such products, and is thereby effectively lubricated. For machines where a four cycle engine is used, or one where oil is not mingled with the gasoline, I provide an oil opening shown closed by a plug 25$^a$, into which oil may be introduced in any suitable manner.

Referring now to the idler unit end of the machine, this comprises a main frame member 26 provided with a socket 26$^a$ to which frame bar or rod 3 is rigidly connected by means such as a bolt or rivet.

Member 26 carries rigidly attached thereto a single horizontally projecting handle 27 designed to be grasped by the other operator. This, in connection with the two handles at the motor end, gives a three-point suspension and enables the person at the motor end, who controls and guides the machine, to easily position and maintain it at the proper angle, the apparatus fulcruming on the handle 27.

The idle pulley hub 27$^x$ is journaled on a stub shaft 28 carried by a swinging arm 29 having a stub shaft portion 30 rotatably held in the bearing portion or socket 26$^b$ of frame member 26. Arm 29 is provided with a handle 29$^a$ by which it may be swung to move the idler pulley for chain adjustment or tightening purposes, and is held in any desired position by a slidable dog 31 pressed normally into engagement with the stationary rack 32 by spring 33 and capable of being retracted by a projection 31$^a$ adjacent the handle 29$^a$. The idler pulley is of a form similar to the drive pulley, comprising flange plates or discs 27$^a$, 27$^b$ and base or strain receiving member 27$^c$, all secured together and to hub 27$^x$ by bolts 27$^e$, which likewise hold in place the dust excluding and oil directing ring 33$^a$.

Oil for lubricating purposes including thorough oiling of the saw to prevent adhering of resin in some types of trees, is supplied from a tank 34 by pipe 35, controlled by stop cock 36, this pipe communicating by a swivel joint with a fitting 36$^a$ resting upon the upper end of bearing sleeve or boss 26$^b$, and enclosing the projecting end of the stub shaft to which it is secured by cotter pin 37 which holds the stub shaft in position.

The oil passes through the hollow stub shaft 30 and by passage 29$^b$ in the arm to the space within protector plate 33$^a$, the open upper side of which is covered by protector plate 38 which has a downwardly turned peripheral flange overlapping the upturned flange of plate 33$^a$ and cooperating therewith to exclude sawdust. The oil is caused, by centrifugal action, to pass out through ports or passages 27$^f$ to the saw receiving groove of the pulley.

It is important that the operator shall be effectually guarded against danger of breakage of the saw, and to this end I provide a protecting bar 39, which is pivoted on the main frame member 26 at 39ª, so that the portion which lies adjacent the idle pulley can be adjusted towards and from the same to allow for the pulley adjustments above described. As a suitable means of securing it in an adjusted position, I provide the fixed quadrant 40 which is engaged by clamping block 41 secured by bolt 41ˣ to the protecting bar. By this means the guard may be kept adjusted so closely to the idle pulley as to prevent the chain from leaving its groove therein. A similar guard is provided adjacent the power unit in the shape of a bar 42, but this is rigidly bolted to the power unit frame and is spaced from the driving pulley a sufficient distance to allow the chain to throw clear of the driving pulley in case of breakage and thus instantly stop the drive.

Having thus described my invention, what I claim is:—

1. In apparatus of the class described, a suitable frame, power and idler units carried thereby, including driving and idler pulleys, an endless chain saw passing around said pulleys, said idler unit including a frame member, a stub shaft journaled therein, a swinging arm carried by said stub shaft with means for holding it in fixed position, said idler pulley being carried by said swinging arm, and said stub shaft and arm having lubricant passages for conducting lubricant to said pulley and means for supplying lubricant to said passages.

2. In apparatus of the class described, a suitable frame, power and idler units carried thereby, including driving and idler pulleys, an endless chain saw passing around said pulleys, said idler unit including a frame member, a stub shaft journaled therein, a swinging arm carried by said stub shaft with means for holding it in fixed position, said idler pulley being carried by said swinging arm and having an annular oil receiving trough and passages leading therefrom to the pulley groove, said stub shaft and arm having lubricant passages for conveying lubricant to said trough.

3. In apparatus of the class described, an idle pulley support, comprising a frame member having a bearing boss, an arm lying on the under side of said frame and having a stub shaft projecting through said boss, a cap member above said boss and fast on said stub shaft, a pulley journaled on said arm, and means for holding said arm in fixed position, said stub shaft and arm being hollow for reception of lubricant, and said arm having a lubricant delivery port adjacent said pulley.

4. In a portable sawing machine, a main frame, a power driven saw carried thereby, a single handle at one end of said frame, and a handle bar having its central portion pivotally connected with the opposite end of said frame, and having out-turned handle extensions, and means for holding said handle bar rigid.

5. In a portable sawing machine, a main frame, power and idler units carried thereby at opposite ends of its cutting run, an endless chain saw guided and operated by said units, and a saw kerf penetrating blade projecting from one of said units towards but not beyond the middle of said run and out of contact with the saw, said blade being of a thickness no greater than the kerf, substantially as described.

6. Apparatus according to claim 5 in which the kerf penetrating blade extends from the power unit, substantially as described.

7. A tree sawing apparatus comprising an endless chain saw, a power unit at one end of the cutting run of said saw, and an idler unit at the opposite end of said cutting run, and a kerf penetrating blade extending from the power unit partway along said cutting run towards the idler unit, and spaced apart from the saw to allow the same freedom to flex, said blade being of a thickness not greater than that of the saw to freely enter the kerf, substantially as described.

8. In a portable tree sawing machine and in combination, an idler pulley, a power unit having a pulley, a chain saw passing around said pulleys and with the cutting and idler runs of said chain parallel and extending directly between said pulleys, and a kerf penetrating blade extending from the power unit parallel with and between the parallel runs of the chain saw and in the plane thereof, said blade extending only part way between the units and out of contact with the endless chain saw, leaving the same free to flex, substantially as described.

In testimony whereof, I affix my signature.

SAMUEL J. BENS.